(12) United States Patent
Miller et al.

(10) Patent No.: US 10,868,890 B2
(45) Date of Patent: Dec. 15, 2020

(54) 3D MODELING SYSTEM DISTRIBUTED BETWEEN A CLIENT DEVICE WEB BROWSER AND A SERVER

(71) Applicant: TRIMBLE NAVIGATION LIMITED, Sunnyvale, CA (US)

(72) Inventors: Tyler Miller, Denver, CO (US); John M. Bacus, Boulder, CO (US)

(73) Assignee: Trimble Navigation Limited, Sunnyvale, CA (US)

( * ) Notice: Subject to any disclaimer, the term of this patent is extended or adjusted under 35 U.S.C. 154(b) by 12 days.

(21) Appl. No.: 13/676,340

(22) Filed: Nov. 14, 2012

(65) Prior Publication Data
US 2013/0132466 A1 May 23, 2013

Related U.S. Application Data

(60) Provisional application No. 61/562,814, filed on Nov. 22, 2011.

(51) Int. Cl.
*G06F 15/16* (2006.01)
*H04L 29/06* (2006.01)
(Continued)

(52) U.S. Cl.
CPC ............ *H04L 67/42* (2013.01); *G06F 16/972* (2019.01); *G06T 17/005* (2013.01); *H04L 67/02* (2013.01); *H04L 67/38* (2013.01)

(58) Field of Classification Search
CPC .......... H04L 29/00; H04L 67/42; H04L 67/12
(Continued)

(56) References Cited

U.S. PATENT DOCUMENTS 6,058,397 A 5/2000 Barrus et al.
6,158,903 A 12/2000 Schaeffer et al.
(Continued)

FOREIGN PATENT DOCUMENTS

CA 2665252 * 4/2008 ............ H04L 12/16
CA 2781638 6/2011
(Continued)

OTHER PUBLICATIONS

Changjiu Xian, Yung-Hsiang Lu and Zhiyuan Li, "Adaptive computation offloading for energy conservation on battery-powered systems," 2007 International Conference on Parallel and Distributed Systems, Hsinchu, 2007, pp. 1-8.*
(Continued)

*Primary Examiner* — Melvin H Pollack
*Assistant Examiner* — Messeret F Gebre
(74) *Attorney, Agent, or Firm* — Sheridan Ross P.C.

(57) ABSTRACT

A system and method for implementing the functions of a web-based 3D modeling system partially as a script interpretable by a client browser application and partially as a component executing on a server modeling engine. A client-side script component may execute lightweight modeling system commands while the server-side modeling engine may execute computationally expensive 3D modeling system commands. For example, the script component may be accessed by the client device upon visiting a web page of the modeling service hosted by the web server. The script may include Javascript® instructions for viewing a 3D model in a browser window without installing a browser plug-in or a standalone application on the client device. However, to edit the model, the script component may forward commands and requests to the server via the network and also receive modified model data from the server.

13 Claims, 5 Drawing Sheets

(51) Int. Cl.
  *H04L 29/08* (2006.01)
  *G06T 17/00* (2006.01)
  *G06F 16/958* (2019.01)

(58) Field of Classification Search
  USPC .............................. 703/203; 709/203, 205
  See application file for complete search history.

(56) References Cited

U.S. PATENT DOCUMENTS

| | | | |
|---|---|---|---|
| 6,222,551 B1* | 4/2001 | Schneider | G06T 15/20 345/419 |
| 7,092,907 B2 | 8/2006 | Kanevsky et al. | |
| 7,139,444 B2 | 11/2006 | Ameline et al. | |
| 7,200,639 B1 | 4/2007 | Yoshida | |
| 7,516,132 B1 | 4/2009 | Fast et al. | |
| 7,917,584 B2 | 3/2011 | Arthursson | |
| 8,311,894 B2 | 11/2012 | Nykamp | |
| 2002/0069215 A1 | 6/2002 | Orbanes et al. | |
| 2002/0154144 A1 | 10/2002 | Lofgren et al. | |
| 2003/0021439 A1 | 1/2003 | Lubin et al. | |
| 2003/0090530 A1* | 5/2003 | Ramani | G06F 17/50 715/848 |
| 2003/0135557 A1 | 7/2003 | Davis | |
| 2004/0068187 A1 | 4/2004 | Krause et al. | |
| 2004/0153824 A1 | 8/2004 | Devarajan et al. | |
| 2004/0239679 A1 | 12/2004 | Ito et al. | |
| 2005/0081161 A1 | 4/2005 | MacInnes et al. | |
| 2005/0131659 A1 | 6/2005 | Mei et al. | |
| 2005/0165859 A1 | 7/2005 | Geyer et al. | |
| 2006/0066609 A1 | 3/2006 | Iodice et al. | |
| 2006/0119601 A1 | 6/2006 | Finlayson et al. | |
| 2006/0250418 A1 | 11/2006 | Chartier et al. | |
| 2007/0171790 A1 | 7/2007 | Blackmon | |
| 2007/0174027 A1 | 7/2007 | Moiseyev | |
| 2008/0028323 A1 | 1/2008 | Rosen et al. | |
| 2008/0046828 A1 | 2/2008 | Bibliowicz et al. | |
| 2008/0140732 A1 | 6/2008 | Wilson et al. | |
| 2008/0141334 A1 | 6/2008 | Wicker et al. | |
| 2008/0229234 A1* | 9/2008 | Astolfi et al. | 715/782 |
| 2009/0046094 A1 | 2/2009 | Hamilton, II et al. | |
| 2009/0077119 A1 | 3/2009 | Speth et al. | |
| 2009/0141023 A1 | 6/2009 | Shuster | |
| 2009/0237411 A1 | 9/2009 | Gossweiler et al. | |
| 2010/0013842 A1 | 1/2010 | Green et al. | |
| 2010/0017461 A1 | 1/2010 | Kokkevis et al. | |
| 2010/0030578 A1 | 2/2010 | Siddique et al. | |
| 2010/0031196 A1* | 2/2010 | Ordody | G06F 17/30905 715/810 |
| 2010/0045662 A1 | 2/2010 | Boothroyd et al. | |
| 2010/0118039 A1 | 5/2010 | Labour | |
| 2010/0146085 A1 | 6/2010 | Van Wie et al. | |
| 2010/0198563 A1 | 8/2010 | Plewe | |
| 2011/0025688 A1 | 2/2011 | Schneider et al. | |
| 2011/0153368 A1 | 6/2011 | Pierre et al. | |
| 2011/0169826 A1 | 7/2011 | Elsberg et al. | |
| 2012/0054261 A1* | 3/2012 | Evans et al. | 709/203 |
| 2012/0109591 A1 | 5/2012 | Thompson et al. | |
| 2012/0117145 A1* | 5/2012 | Clift et al. | 709/203 |
| 2012/0331061 A1 | 12/2012 | Lininger | |
| 2013/0035904 A1 | 2/2013 | Kuhn | |
| 2013/0120367 A1 | 5/2013 | Miller et al. | |
| 2013/0120368 A1 | 5/2013 | Miller et al. | |
| 2013/0120369 A1 | 5/2013 | Miller et al. | |
| 2013/0144566 A1 | 6/2013 | De Biswas | |
| 2014/0033265 A1 | 1/2014 | Leeds et al. | |

FOREIGN PATENT DOCUMENTS

| | | |
|---|---|---|
| EP | 0899695 | 3/1999 |
| EP | 1004068 | 5/2000 |
| EP | 2352120 | 8/2011 |
| JP | 2001-229401 | 8/2001 |
| JP | 2003-099805 | 4/2003 |
| JP | 2005-269280 | 9/2005 |
| WO | WO 2008/041061 | 4/2008 |
| WO | WO 2010/035266 | 4/2010 |

OTHER PUBLICATIONS

R. Puri and D. S. Kung, "The Dawn of 22nm Era: Design and CAD Challenges," 2010 23rd International Conference on VLSI Design, Bangalore, 2010, pp. 429-433 (Year: 2010).*

Dong, X., & Xie, Y. (2009). System-level cost analysis and design exploration for three-dimensional integrated circuits (3isc) doi: http://dx.doi.org/10.1109/ASPDAC.2009. (Year: 2009).*

Vaidyanathan, W. Hung, F. Wang, Y. Xie, V. Narayanan and M. J. Irwin, "Architecting Microprocessor Components in 3D Design Space," 20th International Conference on VLSI Design held jointly with 6th International Conference on Embedded Systems (VLSID '07), Bangalore, 2007, pp. 103-108. (Year: 2007).*

"Collaborative real-time editor" Wikipedia, the free encyclopedia, Nov. 7, 2011, 7 pages [retrieved from: http://en.wikipedia.org/w/index.php?title=Collaborative_real-time_editor&oldid=459190583].

Agustina et al. "CoMaya," Proceedings of the ACM 2008 Conference on Computer Supported Cooperative Work, CSCW '08, Jan. 1, 2008, pp. 5-8, XP055163225, ISBN: 978-1-60-558007-4.

Ammon et al., "Collaboration on Scene Graph Based 3D Data," from Advances in Computer Graphics and Computer Vision: Int'l Conferences VISAPP and GRAPP 2006, Braz et al. (eds), Springer-Verlag, 2007, pp. 78-90.

Koller et al. "Research Challenges for Digital Archives of 3D Cultural Heritage Models," ACM Journal on Computing and Cultural Heritage, Dec. 2009, vol. 2, No. 3, Article 7, 17 pages.

Ku et al., "3D Model-Based Collaboration in Design Development and Construction of Complex Shaped Buildings," Itcon, 2008, vol. 13, pp. 458-485.

Ohbuchi et al. "Watermarking Three-Dimensional Polygonal Models," Proceedings of the Fifth ACRM Internal Conference on Multimedia, 1997, pp. 261-272.

Shaojin et al. "An asynchronous CAD collaborative design model," Computer Application and System Modeling (ICCASM), 2010 International Conference on, IEEE, Piscataway, NJ, USA, Oct. 22, 2010, pp. V6-563-V6-568, XP031789329, ISBN: 978-1-4244-7235-2.

Sohn et al. "User transparent 3D watermarking system based on security policy," International conference on Cyberworlds, Oct. 2007, pp. 89-92.

Sun et al. "Transparent adaptation of single-user applications for multi-user real-time collaboration," ACM Transactions on Computer-Human Interaction, Dec. 1, 2006, vol. 13, No. 4, pp. 531-552, XP055163216, ISSN: 1073-0516.

Extended Search Report for European Patent Application No. 12849377.2, dated May 18, 2015 6 pages.

Extended Search Report for European Patent Application No. 12851259.7, dated May 4, 2015 6 pages.

Extended European Search Report for European Patent Application No. 12850623.5, dated Dec. 3, 2015, 7 pages.

Extended Search Report for European Patent Application No. 12850450.3, dated Jul. 15, 2015 8 pages.

Extended Search Report for European Patent Application No. 12804395.7, dated Jan. 28, 2015 12 pages.

Official Action for U.S. Appl. No. 13/676,323, dated Sep. 16, 2015 76 pages.

Official Action for U.S. Appl. No. 13/676,330, dated Apr. 21, 2015 34 pages.

Notice of Allowance for U.S. Appl. No. 13/676,330, dated Aug. 10, 2015 8 pages.

Official Action for U.S. Appl. No. 13/676,338, dated Mar. 31, 2015 38 pages.

Notice of Allowance for U.S. Appl. No. 13/676,338, dated Aug. 12, 2015 12 pages.

Official Action for U.S. Appl. No. 13/169,705, dated May 6, 2015 12 pages.

(56) References Cited

OTHER PUBLICATIONS

Notice of Allowance for U.S. Appl. No. 13/169,705, dated Sep. 1, 2015 7 pages.
Official Action for U.S. Appl. No. 13/676,323, dated Mar. 24, 2015 63 pages.
Official Action for U.S. Appl. No. 13/676,330, dated Nov. 19, 2014 28 pages.
Official Action for U.S. Appl. No. 13/169,705, dated Oct. 21, 2014 12 pages.
International Search Report for International (PCT) Patent Application No. PCT/US2012/064926, dated Mar. 29, 2013 3 pages.
International Preliminary Report on Patentability for International (PCT) Patent Application No. PCT/US2012/064926, dated May 30, 2014 6 pages.
International Search Report and Written Opinion for International (PCT) Patent Application No. PCT/US2012/064931, dated Mar. 13, 2013 9 pages.
International Preliminary Report on Patentability for International (PCT) Patent Application No. PCT/US2012/064931, dated Jun. 5, 2014 6 pages.
International Search Report and Written Opinion for International (PCT) Patent Application No. PCT/US2012/064932, dated Mar. 22, 2013 11 pages.
International Preliminary Report on Patentability for International (PCT) Patent Application No. PCT/US2012/064932, dated May 30, 2014 8 pages.
International Search Report and Written Opinion for International (PCT) Patent Application No. PCT/US2012/064940, dated Mar. 26, 2013 9 pages.
International Preliminary Report on Patentability for Intenational (PCT) Patent Application No. PCT?US2012/064940, dated May 30, 2014 8 pages.
International Search Report and Written Opinion for Application No. PCT/US2012/044297, dated Dec. 27, 2012.
International Preliminary Report on Patentability for International (PCT) Patent Application No. PCT/US2012/044297, dated Jan. 16, 2014 8 pages.
Official Action for U.S. Appl. No. 13/159,705, dated Jul. 16, 2013.
Official Action for U.S. Appl. No. 13/159,705, dated Mar. 20, 2014.
Official Action for European Patent Application No. 12849377.2, dated Oct. 10, 2016 4 pages.
Intention to Grant for European Patent Application No. 12849377.2, dated Jul. 3, 2017 86 pages.
Official Action for European Patent Application No. 12851259.7, dated Dec. 12, 2016 4 pages.
Official Action for U.S. Appl. No. 13/676,323, dated Apr. 14, 2016 66 pages.
Official Action for U.S. Appl. No. 13/676,323, dated Sep. 20, 2016 45 pages.
Notice of Allowance for U.S. Appl. No. 13/676,323, dated May 30, 2017 12 pages.
Notice of Allowance for U.S. Appl. No. 13/676,330, dated Jun. 3, 2016 9 pages.
Notice of Allowance for U.S. Appl. No. 13/169,705, dated Dec. 21, 2015 5 pages.

\* cited by examiner

3D MODELING SYSTEM DISTRIBUTED BETWEEN A CLIENT DEVICE WEB BROWSER AND A SERVER

CROSS REFERENCE TO RELATED APPLICATIONS

This application claims the benefit of U.S. Provisional Patent Application No. 61/562,814, filed on Nov. 22, 2011, entitled "3D Modeling System Distributed Between A Client Device Web Browser and a Server," the disclosure of which is hereby expressly incorporated herein by reference.

FIELD OF THE DISCLOSURE

This disclosure relates to a system and method for developing three-dimensional models of graphical objects and, in particular, to a three-dimensional modeling system that is distributed between the web browser of a client device and a server that allows a user to develop three-dimensional graphic objects.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Today, professional as well as non-professional users in a variety of different fields, such as engineering, architecture, automotive design, graphic design, advertising, fashion design, medicine, etc., can develop three-dimensional (3D) models of buildings, vehicles, and other objects using 3D modeling software that operates on a computing device. A user typically interacts with 3D modeling software via input devices such as a keyboard, mouse, trackball, and/or stylus, and the drafting document is displayed on a graphical display device, such as a computer monitor or screen.

In general, 3D modeling software allows a user to draw various three-dimensional shapes (directly or by defining two-dimensional faces that make up 3D shapes), apply colors and/or textures to the shapes, move, scale, rotate, and skew the shapes, etc. 3D modeling software typically provides the user with stock objects (e.g., 3D shapes such as spheres or parallelepipeds and/or two-dimensional (2D) shapes such as arcs, circles, rectangles, and other known geometric shapes) and/or provides tools to create such objects. Further, 3D modeling software typically allows users to save models as files that conform to a certain predefined format. To share models, users transmit to each other files with the corresponding model data, or upload the files to data servers.

Like any client-side application, as a 3D modeling system offers more functions for users, the application becomes more complex. Increased complexity leads to the use of more and more system resources and, consequently, a 3D modeling system may become too complex for use on mobile computing systems such as table computers and smart phones.

SUMMARY

The features and advantages described in this summary and the following detailed description are not all-inclusive. Many additional features and advantages will be apparent to one of ordinary skill in the art in view of the drawings, specification, and claims hereof. Additionally, other embodiments may omit one or more (or all) of the features and advantages described in this summary.

In an embodiment, a tangible non-transitory computer-readable medium may store instructions for three-dimensional (3D) modeling in a client browser application that executes on a first processor of a client computing device and a server modeling engine that executes on a second processor of a server computing device. A first instruction may include a script that executes on the first processor including functions to receive a user command from the client browser application. The command may include a lightweight command or a computationally expensive command. The script may also include functions to execute the lightweight command and to send the computationally expensive command to the server computing device. A second instruction may include a modeling engine that executes on the second processor including functions to receive the forwarded computationally expensive command, execute the command, and send results of the computationally expensive command execution to the client computing device. Third instructions may include a display module that executes on the first processor including functions to receive results of the lightweight command execution and the computationally expensive command execution and display a 3D model in a window of the client browser application according to the received results.

A further embodiment may include a computing device for implementing functions of a 3D modeling system. The computing device may comprise a network interface coupled to a communication network, a processor, a memory coupled to the processor, a display device coupled to the processor, and a browser application stored in the memory and that executes on the processor. The browser application may receive modeling website data and model data from a remote modeling server via the communications network interface. The modeling website data may include a user interface module displayed on the display device to receive commands and a modeling script component including functions interpretable by the browser application. The script component functions may execute a lightweight command received by the user interface, forward a computationally expensive command to the remote modeling server via the communications network, and receive modified model data via the communications network, wherein the modified model data is modified by execution of the computationally expensive command at the remote modeling server.

The modeling script may include Javascript® instructions embedded within HTML instructions corresponding to the modeling website data. The lightweight command may include one or more functions associated with viewing or exporting the model data. Further, the client browser application may receive the script in response to a request from the browser application to the modeling engine. The request for data may correspond to a modeling website. The modeling engine may receive the request each time the browser application initiates a session with the server modeling engine. Still further, the modeling script component may include further functions interpretable by the browser application to interpret model data, determine a combination of geometric primitives, and invoke an OpenGL function corresponding to the geometric primitives.

In a still further embodiment, a method may implement functions of a 3D modeling system via a communications network with a client browser application that executes on a client computing device processor and a server modeling engine that executes on a server computing device processor. The method may include several steps or functions including sending a request for modeling website data to the server modeling engine via the communications network and receiving modeling website data at the client browser application in response to the request via the communications network. The modeling website data may include a user interface module for displaying a modeling user interface within a window of the client browser application, and a modeling script component including functions interpretable by the browser application. The method may also receive a 3D modeling command at the user interface. Furthermore, upon determining that the 3D modeling command includes a lightweight command, the method may execute the lightweight command at the client computing device using a function of the modeling script component. Alternatively, upon determining that the 3D modeling command includes a computationally expensive command, the method may forward the computationally expensive command to the server modeling engine via the communications network, and receive model data via the communications network. The received model data may have been modified by execution of the computationally expensive command at the server modeling engine.

The figures depict a preferred embodiment of the present invention for purposes of illustration only. One skilled in the art will readily recognize from the following discussion that alternative embodiments of the structures and methods illustrated herein may be employed without departing from the principles of the invention described herein.

DETAILED DESCRIPTION

In embodiments described below, a 3D modeling system may operate partially as a script that is interpretable by a browser application executing on a client device and partially as a component executing on a server. In some embodiments, the 3D modeling script may include Javascript instructions for viewing a 3D model in a browser window without installing a browser plug-in or a standalone application on the client. However, to perform more detailed operations with the 3D modeling system (e.g., edit, create, manipulate a model, etc.), the 3D modeling script may use a network to forward commands to a server executing the 3D modeling component. The 3D modeling component may then use the commands to execute various instructions to edit or manipulate various 3D objects at the server and return the results of that execution back to the client via the network. The systems and methods described herein may permit a user to apply some computationally lightweight functions of the 3D modeling system (e.g., viewing, exporting, etc.) without a 3D modeling application installed at the client while delegating resource-intensive operations and other operations that may be too slow or inefficient for a browser-interpreted script to execute to the server.

Using the 3D modeling script, a user can access backend modeling functionality without launching a separate application and without installing compiled software components on the client device. The 3D modeling script (or simply "the script") generally allows the user to perform lightweight modeling functions (e.g., view, export, manipulate, etc.) on models of buildings, vehicles, items of furniture, and other objects using various controls, via the browser application. For example, the 3D modeling script may allow the user to rotate a 3D model displayed in a browser application window, change the angle and the distance of the viewpoint relative to the model, and otherwise control the manner in which the model is rendered on a user interface of the client device. The script may also receive user commands via the browser for modifying the 3D model, send the commands to a backend server executing a 3D modeling component that generates a representation of the desired modifications (also referred to below as "mutations" of the model), and cause the modifications to the 3D model to be sent to the client and, when used in a collaborative environment, synchronize with at least one other client device (see U.S. patent application Ser. No. 13/169,705, filed Jun. 27, 2011, entitled "Collaborative Development of a Model on a Network," the entire disclosure of which is hereby expressly incorporated herein by reference). The 3D model may be stored in a backend computer memory as data that specifies multiple simple (e.g., cuboids, spheres) and aggregate components having groups of simple components. Modifications to the 3D model may include modifications of dimensionality, positioning, color or texture, and other properties of some or all of the components described by the model data.

To operate through a web browser application, the 3D modeling software module executing at a server may include components to display a user interface through a document object model (DOM) of a browser application or through a window controlled by the browser application, the networking functions of the client device on which the browser application executes, and the graphics functions provided by the browser application.

Figure 1:
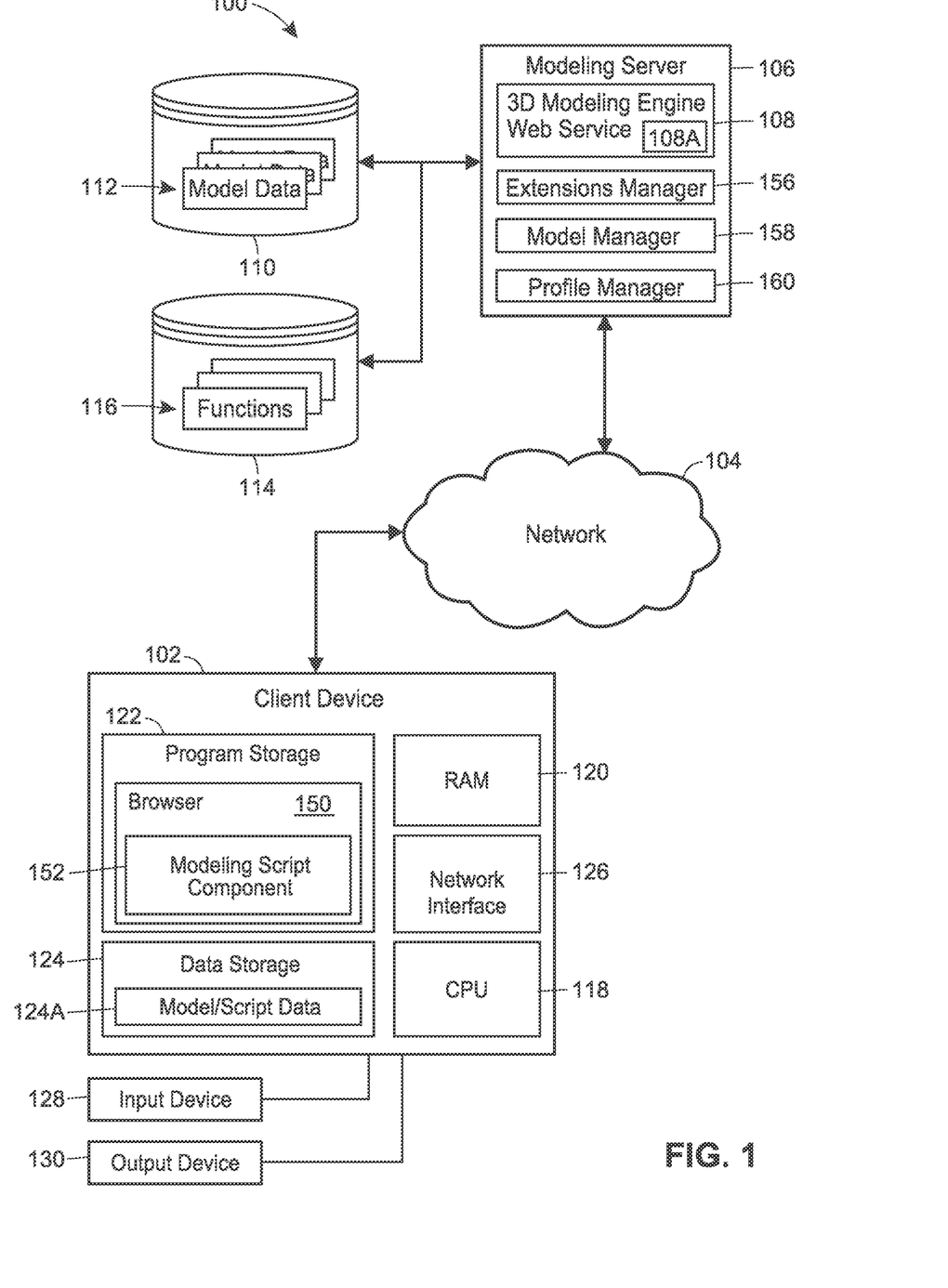
FIG. 1 is a block diagram of a communication system in which techniques of the present disclosure are utilized to implement a web-based 3D modeling system.

Referring to FIG. 1, techniques for implementing a 3D modeling system partially as a script that is interpreted by a client-side browser application of a client computing device and partially as a server-side component executed at a remote modeling server may be implemented in a communication system 100, for example. In an embodiment, the communication system 100 includes a client device 102 and a communication network 104 to which the client device 102 is communicatively coupled. In operation, a user operating the client device 102 develops a model of an 3D object or a group of objects. The communication system 100 may also include a modeling server 106 in which a modeling engine 108 facilitates creating and sharing models during the model development process. The modeling server 106 may be coupled to the client device 102 via the communication network 106. Further, in an embodiment, the communication system 100 includes a model database 110 to store model data 112 corresponding to various 3D models.

The client device 102 includes a central processing unit (CPU) 118 having one or more processors to execute computer-readable instructions, a random access memory (RAM) unit 120 to store data and instructions during operation, program storage 122 including persistent memory to store software applications, shared software components such as Dynamic-link Libraries (DLLs), and other programs executed by the CPU 118, data storage 124 including persistent memory to store data used by the programs stored in the program storage 122, and a network interface 126 to support wired and/or wireless communications with the modeling server 106 and other devices operating on the network 104. By way of example, the program storage 122 and the data storage 124 may be implemented on a hard disk drive (HDD) coupled to the CPU 118 via a bus. Generally speaking, each of the components 118, 120, 122, 124, and 126 may be implemented in any suitable manner as a single module or function block, multiple modules, or a component of another module. Further, the memory components such as the RAM 120, the program storage 122, and the data storage 124 may include any suitable type of tangible, non-transitory computer-readable medium.

In the example implementation of FIG. 1, the client device 102 is a personal computer (PC). However, in general, the client device 102 may be any suitable stationary or portable computing device such as a tablet PC, a smart phone, etc. Although the computing device 102 in the example of FIG. 1 includes both storage and processing components, the client device 102 in other embodiments can be a so-called thin client that depends on another computing device for certain computing and/or storage functions. For example, in one such embodiment, the data storage 124 and the program storage 122 are external to the computing device 102 and are connected to the client device 102 via a network link. Further, the client device 102 may be coupled to an input device 128 and an output device 130. The input device 128 may include, for example, a pointing device such as a mouse, a keyboard, a touch screen, a trackball device, a digitizing tablet, or a microphone, and the output device 130 may include an LCD display device, a touch screen, or another suitable output device. Using the input device 128 and the output device 130, a user can access a graphical user interface (GUI) of the client device 102.

With continued reference to FIG. 1, the program storage 122 may store a browser application 150 for interpreting a script component for the modeling system as herein described, retrieving content from a mapping server 106 operating on the network 104, interpreting and rendering the content, supporting various user interactions with the retrieved content, and providing an interface for the modeling engine 108 executed by the modeling server 106 and the script component 152. Several examples related to browser functionality are discussed in more detail below with reference to FIGS. 2A and 2B. In some embodiments, the server 106 stores a 3D modeling engine component 108 that implements a modeling website user interface 108A and model editing functions while the browser application 150 displays the modeling website 108A and interprets a modeling script component 152 that is described by various instructions (e.g., HTML, Javascript, etc.) sent from the server 106 in response to a request from the browser application 122 for the website data 108A. The script component 152 may include instructions that are interpretable by the browser 150 to perform lightweight modeling functions (i.e., viewing, exporting, etc) with various sets of model data 112 stored in the model database 110. The script component 152 may be sent to the client device 102 each time a user initiates a session with the modeling server 106 and stored in the RAM 120 during runtime. For example, the script 152 may be downloaded from the modeling server 106 each time a user accesses a service of the modeling server 106 such as the modeling engine web service 108. To this end, the modeling server 106 may include a tangible, non-transitory computer-readable medium on which the instructions of the modeling script 152, modeling web service 108, model data 112 and other components are stored and used with or by the client device.

As explained below, the modeling script 152 may include a set of instructions stored on a computer-readable medium and interpretable by the browser application 150 at runtime to be executed on the CPU 118. Generally speaking, the modeling script 152 provides a set of lightweight modeling controls to view, export, position, and variously adjust three-dimensional objects.

Figure 2A:
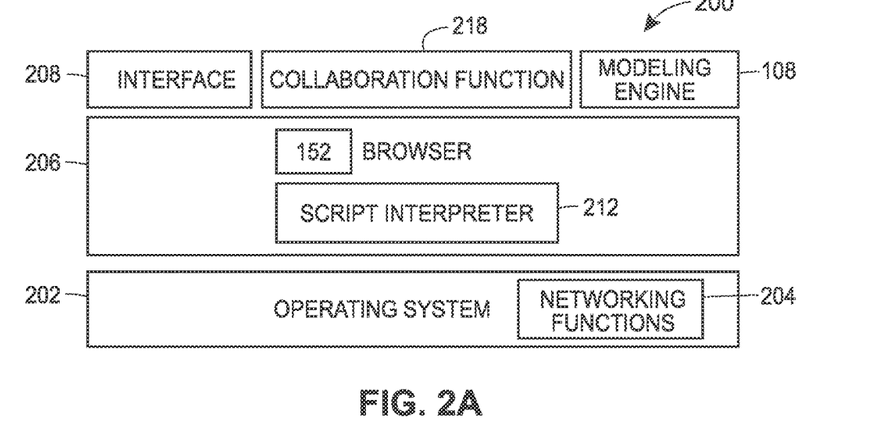
FIG. 2A is a high-level block diagram of an example computing environment implemented in a client device of FIG. 1, in which a 3D modeling system is implemented partially as a script and partially as a component executing on a server.
Figure 2B:
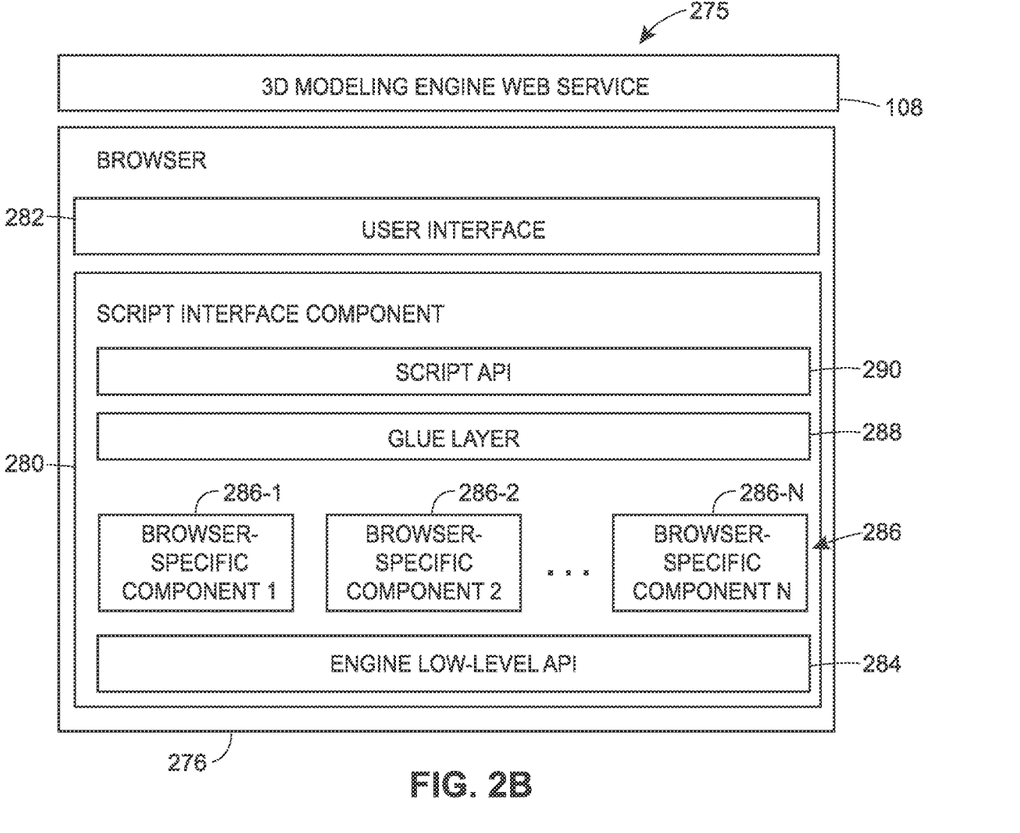
FIG. 2B is a high-level block diagram of another example computing environment that can be implemented in a client device of FIG. 1.

FIGS. 2A and 2B illustrate examples of a computing environment in which a 3D modeling web service 108 and script 152 may operate as a modeling client in a browser application. The client device 102 of FIG. 1 may implement the computing environment of any of FIGS. 2A and 2B or a suitable combination of these environments.

With reference to FIG. 2A, a computing environment 200 may include an operating system 202, which may be any suitable operating system such as Android, Windows, Linux, Mac OS, Android, iOS etc. In general, the operating system 110 may include functions and support drivers for scheduling and executing tasks, obtaining memory resources, accessing the file system as well as input devices, output devices, display devices, and other peripheral devices, exchanging messages between tasks, etc. The operating system 202 may include networking functions 204 to support wired and/or wireless communications with other network devices. For example, the networking functions 204 may include device drivers to support network cards or other network interface modules, such as the network interface 126 illustrated in FIG. 1, for example.

In the computing environment 200, a browser application 206 executes on the operating system 202 to provide browser functionality, which may include core browser functionality, user interface features and, optionally, one or several additional features such as playback of certain multimedia content, for example. Generally speaking, core browser functionality may include messaging according to such communication protocols as Internet Protocol (IP), Transmission Control Protocol (TCP), User Datagram Protocol (UDP), Secure Socket Layer (SSL), and Hypertext Transfer Protocol (HTTP), parsing of content provided in a mark-up language (e.g., Hypertext Markup Language or HTML) and scripts provided in a scripting language (e.g., JavaScript), authentication, management of digital certificates for SSL communications, caching web content and managing the cache, etc. In other embodiments, however, at least some of the messaging functionality may be provided by the operating system 202 (e.g., by the networking functions 204). Further, depending on the implementation, the core browser functionality may include rendering images provided in a standard image format such as BMP, JPEG, or GIF, for example, as well as playing back audio files or feeds and displaying video content provided in respective audio and video formats. An interface 208 for the modeling engine web service 108 may be implemented as one component of modeling website data 108A provided to the browser 206 or as a script that is interpreted by the browser 206 script interpreter 212. The browser interface 208 may allow a user to interact with functions of a modeling engine web service 108 to create and edit models or a modeling script component 152 that is interpreted by the browser 150. The browser 206 and interface 208 may also use functions provided by the operating system 202 for generating viewing windows, displaying user controls, processing events related to the displayed user controls, etc.

The modeling engine web service component 108 may communicate with a script interpreter 212 operating on the browser 206 of the client device. In one embodiment, the browser script interpreter 212 receives events and data from, and provides content to, the browser module 206. For example, the browser script interpreter 212 may receive keyboard events, mouse click events, touch screen gesture events, voice commands, packets received from network devices via the network functions 204, relevant events of the OS 202, etc. The browser script interpreter 212 may provide data such as a raster image of a 3D model to the browser 206, route events originating in the modeling component 108 to the browser 206, etc. In general, the interface 208 may facilitate various interactions between the browser 206, the script 152, the modeling component 108 and a script interpreter 212, as described herein.

The modeling component 108 may also interpret model data to generate a raster image of the corresponding 3D model, create new components in response to commands received via the interface 208, modify model data to add, remove, resize, retexture, and otherwise update selected components, and provide other functionality for developing 3D models. In other embodiments, the modeling component 108 may send data to the browser 206. The browser 206 may then interpret or rasterize that data to render, manipulate, and edit 3D models using, for example, Open GL® and ActiveX® functions. Using the interface 208 to interact with the modeling component 108, a user may generate and position 3D shapes (and, in some cases, 2D shapes), apply colors and/or textures to various shapes, move, scale, rotate, and skew the shapes, group shapes to define aggregate model components, etc.

A collaboration function 218 may allow users to select various mechanisms for resolving or preventing conflicts between concurrent edits of models 112. Users may select the desired mechanisms programmatically, for example, via additional scripts compatible with the script-based collaboration function 218. In an embodiment, the collaboration function 218 includes a locking function to lock the model or a component of the model so as to reserve the model or the component for editing. In response to a user activating the locking function, the collaboration function 218 may generate a locking notification to notify one or more client devices that the script/component has been locked. Various other functions may allow client devices to modify the same script/component in parallel without locking the component and allow users to select various mechanisms for resolving or preventing conflicts between concurrent edits.

FIG. 2B illustrates an example client-side 3D modeling sub-system 275 that may be implemented in the client device 102 of FIG. 1. As another example, the modeling client device 108 and the browser 206 of FIG. 2A may be implemented similar to the 3D modeling sub-system 275. The 3D modeling sub-system 275 includes a browser application 276 with which a 3D modeling engine web service 108 may communicate with the browser application 276 via the network 104 and a script interface/interpreter 280. The functions of the 3D modeling engine web service 108 may be received and interpreted by the browser 276.

The 3D modeling engine web service 108 may be platform-independent and can provide different instructions to the client device 102 according to the type of browser (e.g., Chrome®, Safari®, Firefox®, Explorer®, etc.) and operating system running on the client device. In some embodiments, the 3D modeling engine web service 108 utilizes graphics functions provided as various scripts interpreted by the browser application 276. For example, the 3D modeling engine web service 108 may use cross-platform APIs for efficiently rendering graphics such as OpenGL®. More specifically, the 3D modeling engine web service 108 may send model data, which may include descriptions of various 3D and/or 2D shapes that make up the corresponding 3D model (stored in any suitable format including a proprietary format defined specifically for 3D model data), and invoke various functions of the OpenGL API for drawing lines, points, and other basic primitives to efficiently generate raster images at the client device. The OpenGL API, in turn, may utilize the available graphics hardware, such a GPU, transparently to the 3D modeling engine web service 108 and the operating system of the client device. In response to receiving a user interface event from the browser application 276 indicating that the 3D model is to be edited, the script component 280 may send the model data back to the server 106 and the modeling engine 108 may re-interpret the model data to determine which combination of geometric primitives describes the new perspective view of the 3D model. The component 108 may then invoke the corresponding OpenGL functions, and send the data back to the client device to be re-rendered.

The 3D modeling sub-system 275 also may include a script interface component 280 to facilitate the interaction of the 3D modeling engine 108 with the user interface module 282 of the browser application 276 and provide a framework for interpreting instructions and data from the 3D modeling engine web service 108. More specifically, the script interface component 280 may include a low-level engine API 284, one or several browser-specific components 286, a glue layer 288, and a script API 290. The browser-specific components 286 may include, for example, an ActiveX® component 286-1 configured to wrap, or operate as a proxy for, the functions of the 3D modeling engine web service 108 so as to operate specifically in an ActiveX® framework if the browser application 276 is a Microsoft Explorer® browser or a compatible application. As another example, the component 286-2 may be a Netscape® Plugin Application Programming Interface (NPAPI) component. Depending on the implementation of the browser application 276, one of the browser-specific components 286 may be active when 3D modeling functionality of the modeling sub-system 275 is invoked, while the other browser-specific components 286 may remain inactive.

The low-level engine API 284 provides an interface between the 3D browser-specific components 286 and the 3D modeling engine 108, so that the same 3D modeling engine 108 can be used in multiple (or all) browser applications, which in some cases are provided by different manufacturers. For example, in an embodiment, the same 3D modeling engine component 108 can be used in a Microsoft Explorer, Mozilla Firefox, Safari, or a Google Chrome browser application 276, and a respective one of the browser-specific components 286 makes the 3D modeling engine service 108 compatible with the corresponding framework via the low-level engine API 284.

The glue layer 288 may be implemented in an Interface Description Language (IDL), for example, to bridge browser-specific components 286 with the script API 290, which provides access to at least some functions of the 3D modeling engine service 108 (and, in some cases, other functions exposed by the browser application 276) via a scripting language interpretable by the browser application 276 at runtime. The script API 290 may be provided in JavaScript®, for example. Generally speaking, the script API 290 allows users to efficiently extend, customize, and configure the 3D modeling engine web service 108 via various scripts 292.

In an embodiment, 3D modeling engine web service 108 includes collaborative functionality. In another embodiment, however, the 3D modeling engine web service 108 does not include collaborative functionality, and the script API 290 is used to add collaborative functionality to the 3D modeling sub-system 275. For example, referring back to FIG. 2A, the scripting API 212 in the computing environment 200 may be similar to the script API 290, and the collaboration function 218 may be developed as discussed above to add collaborative functionality to the modeling engine 214. In yet another embodiment, the 3D modeling engine 108 provides several different mechanisms that can be used for collaborative modeling on a communication network, and the script API 290 is used to select and access the desired mechanism.

In some embodiments, a user interface module 282 may define user interface functions for 3D modeling as extensions of the browser application 276 or as a component of the server-side modeling engine 108. More specifically, the user interface module 282 may provide functions for manipulating objects (e.g., drag, drop, highlight) within a window which the browser application 276 allocates and controls for 3D modeling. Further, the user interface module 282 may provide various interactive controls displayed within the window. These interactive controls may be, for example, icons on which a user may click to select stock objects, texture or color objects, rotate objects, scale objects, etc. For example, the controls may cause instructions to be sent to the 3D modeling engine web service 108 to manipulate model data to determine a combination of geometric primitives and invoke a corresponding OpenGL function to make changes to the displayed model. The user interface module 282 may also use a function to access another function of the 3D modeling engine web service 108 to add an interactive control within the window. These scripts 292 may define JavaScript functions that implement various interactive controls and functions of the 3D modeling engine web service 108 to draw, format, or edit components of a 3D model. The user interface module 282 may be implemented using a suitable Software Development Kit (SDK) for developing front-end scripts, such as Asynchronous JavaScript and XML (AJAX) instructions, that run on different types of browser applications. In an embodiment, the user interface module 282 is implemented using Google Web Toolkit (GWT).

The devices discussed above may be used to provide a web-based 3D modeling system that is implemented partially as a script interpretable by a browser application executing on a client device and partially as a component executing on a server. While the web-based modeling system is discussed below in relation to 3D models, these or similar techniques also may be applied to 2D drawings and other types of data. For ease of explanation, the scenario is discussed with reference to the client device 102 and the modeling server 106 of FIG. 1.

Figure 3:
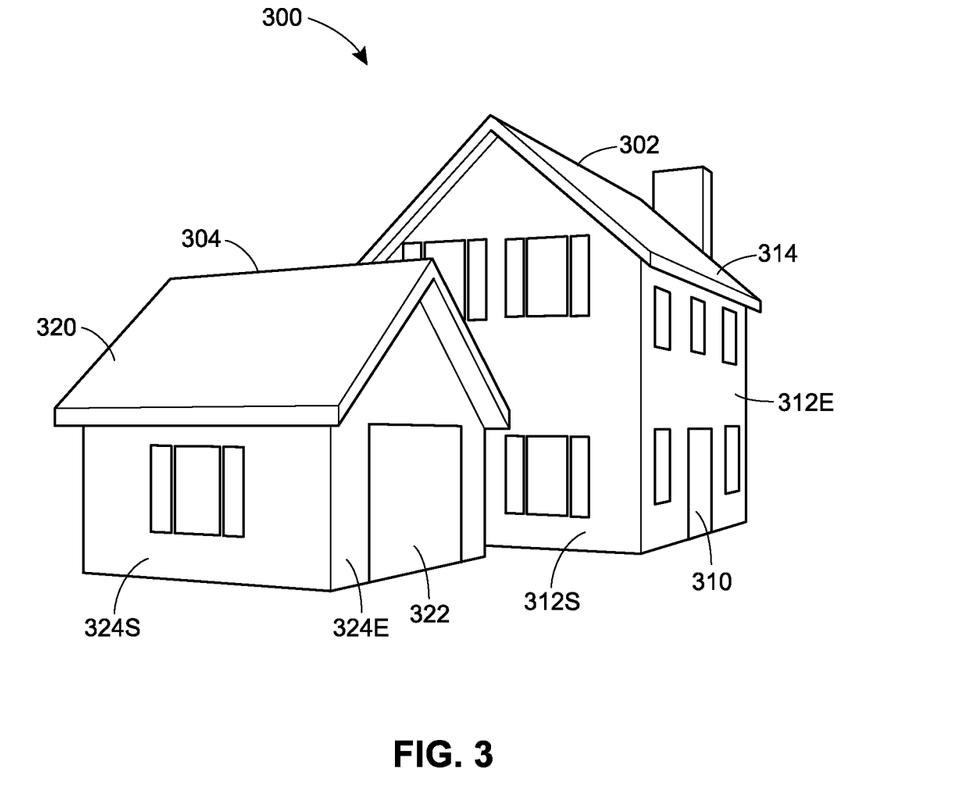
FIG. 3 illustrates an example model which a user operating a client device of the communication system of FIG. 1 may develop.

According to an example scenario, user Abby accesses a 3D modeling website 108A by launching a browser application 150 at her client device 102. The website may correspond to the 3D modeling engine web service 108. Abby may then begin to develop a 3D model 300 as illustrated in FIG. 3. The model 300 may include a house component 302 and a garage component 304. Each of the components 302 and 304 in turn may include several sub-components. For example, the house component 302 includes a door 310, walls including a southern wall 312S, an eastern wall 312E, and a roof 314. A garage component 304 may include a roof 330, a door 322, and walls including a southern wall 312S and an eastern wall 312E. The model 300 may also include other components such as windows and a chimney. According to one embodiment, each of the components illustrated in FIG. 3 is made up of one or more elements such as 3D geographic shapes: cuboids, spheres, pyramids, etc. In another embodiment, the components of FIG. 3 may be generated using groups of two-dimensional faces: squares, circles, triangles, etc.

The 3D modeling engine web service 108 may generate components of the model 300 using the web-based 3D modeling system 100 according to commands received from user Abby. For example, to draw the roof 320, a script component 152 may forward requests, commands, and other data to the modeling server 106 for processing by the 3D modeling engine web service 108. Within a user interface 282 depicted in a browser, Abby may draw multiple shapes and group the shapes using the user interface (e.g., by selecting several shapes with a mouse and activating an icon for generating a group of selected shapes). In general, a model can have nested components at multiple levels. For example, Abby may group several shapes to define a window frame component, then group the window frame component with several 3D shapes to define a window component, create several instances of the window component and group these several instances into a larger "multiple windows" component, etc.

Figure 4:
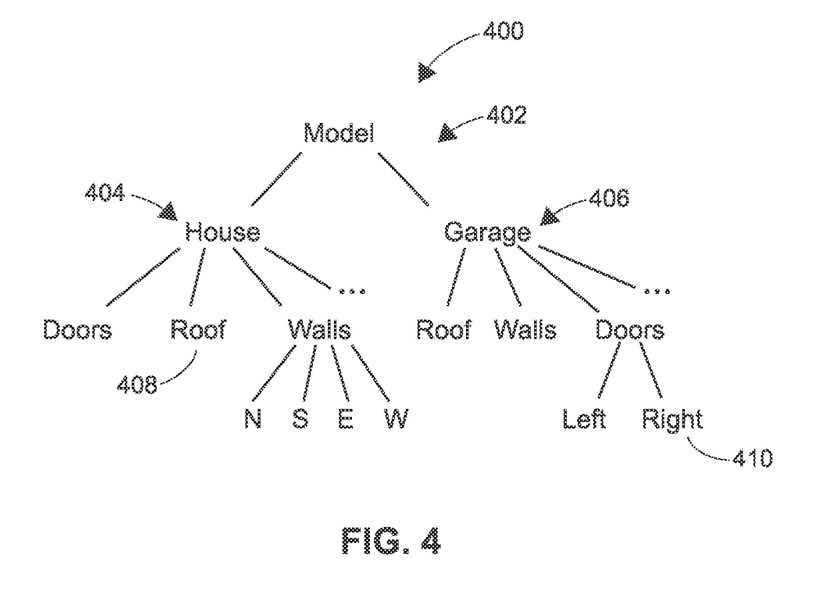
FIG. 4 is an example data structure for a 3D model.

FIG. 4 is a schematic diagram of an example data structure 400 corresponding to the model 300, which the web service 106 may generate with data and commands received using the modeling script component 152 via the network 104. After Abby creates the model 300, the modeling server 106 may initially store model data 112 including the data structure 400 in the data storage 110. The data structure 400 includes a root node 402, a house branch 404, and a garage branch 406. Each of the branches 402 and 406 stores a particular component of the model 300. Further, the house branch 404 includes a roof branch 408 that corresponds to the roof component 314 as well as other branches corresponding to other components (a doors component, a walls component, etc.). As can be seen in FIG. 4, the garage branch 406 includes, among other branches, a doors branch with a right-door branch 410 that corresponds to the component 322. The right-door branch 410 may specify the component 322 as a set of 3D shapes, texture and/or color information, animation data, and other data. In general, a component may include drawing data, non-drawing data (text labels, metadata), and other components that also may include drawing and non-drawing data. In addition to the data structure 400, the model data 124A and 112 may include other information (e.g., metadata) such as timestamp information, user information, etc.

In an embodiment, the modeling script component 152 utilizes the data structure 400 to represent a selected component of the model 300 in a serialized format. Generally speaking, by generating a serialized representation of a component branch, a device operating in a collaborative development environment permits another device, such as a client device or a modeling server, to properly resolve conflicts and address collisions between modifications submitted at several devices. A serialized representation and operational transformation (OT) techniques may allow client devices to modify the same component in parallel without locking the component. A serialized representation of a branch may include a sequence of basic 3D shapes (cuboids, spheres, etc.) that make up the corresponding component.

The modeling script component 152 may provide an interface to function libraries 114 of the 3D modeling engine web service 108. These functions may be invoked by the script component 152 at runtime, and managed by the extensions manager 156. Some functions may be authored by a user to extend the modeling service's basic library of functions.

Figure 5:
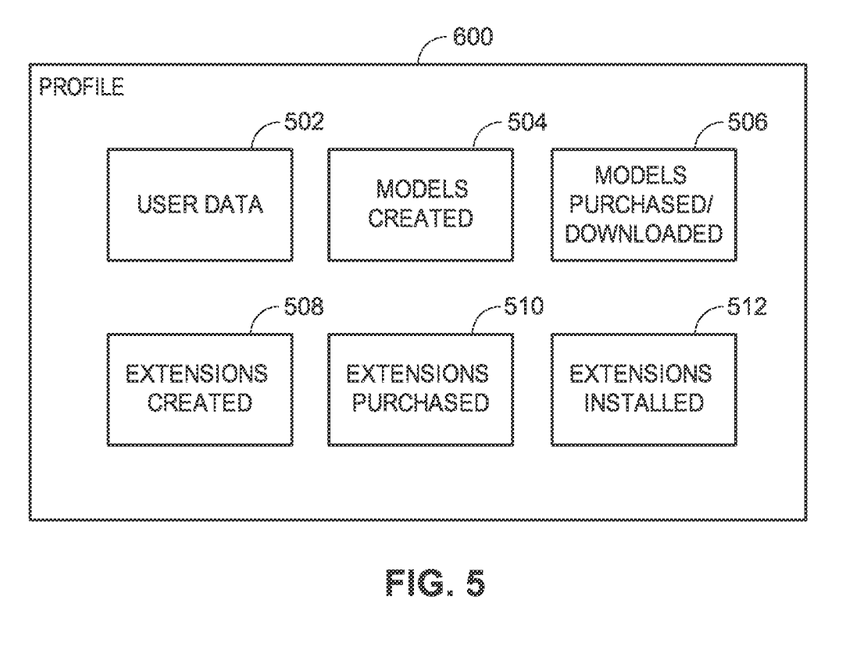
FIG. 5 is an example data structure for a user profile corresponding to a user of the 3D modeling software module.

FIG. 5 is a block diagram representing an exemplary user profile 500 managed by the profile manager 160 (FIG. 1). In an embodiment, the profile 500 includes user data 502. The user data 502 may include personal information about the user, including the user's name, address, phone number, information about client devices associated with the user, etc. In an embodiment, the modeling service 108 may be available according a subscription model. The subscription model may allow various service levels related to functionality of the modeling software, availability of updates, availability of one or more scripts, etc., according to the status of users as subscribers. Accordingly, the user data 502 may also include subscription data, indicating the user's subscription status (i.e., whether the user has a subscription, the type of subscription, when the subscription expires, etc.). The user data 502 may further include payment information, such as credit card information, used for subscription purposes and/or to purchase models 112 and/or scripts 116, in an embodiment.

The profile 500 may also include data 504 about models the user has created, and data 506 about models the user has purchased and/or downloaded. For example, a user may have unrestricted rights to download, edit, and/or share models that the user created, which models are identified in the data 504. Additionally, in an embodiment, the user may choose the rights associated with any particular model 112 that the user created, and the rights associated with each model 112 created by the user may be recorded in the data 504. The data 506, by comparison, may include records related to models 112 that the user has purchased from, for example, an online marketplace of models, or records related to models 112 that user has downloaded or to which the user has been given rights by the model's creator.

The profile 500 may also include data 508, 510, and 512 related to various library functions and extensions 116. For example, the profile 500 includes data 508 related to scripts created by the user Like the models indicated by the data 504, the scripts indicated in the data 508 may be downloadable, editable, or sharable by the user because the user created the scripts. In an embodiment, the user may choose the rights associated with a particular script 116 that the user created, and the rights associated with each script 116 created by the user may be recorded in the data 508. The data 510 may record scripts 116 that the user has purchased, in embodiments implementing a marketplace for extensions (i.e., a means for users to buy and/or sell functions 116).

It is not always necessary or desirable, however, for a user to have installed all of the models 112 or scripts 116 that the user created or those that the user downloaded and/or purchased. For example, a user may create a model 112 or script 116 solely for the purpose of selling it or making it otherwise available to other users, without the user choosing to install it on the device on which the user runs the 3D modeling engine web service 108. For this reason, in an embodiment, the profile 500 additionally includes data 512 indicating models 112 and functions 116 that are currently installed on the user's client device. Thus, any particular model 112 or function 116 may be indicated in the data 508 as created by the user, but not indicated in the data 512 as installed to run on the user's client device. As a result, a user may experience a seamless transition between experiences on multiple client devices. That is, the user may install one or more models 112 or functions 116 to run with the client on the user's tablet computer (e.g., the client device 102), and the scripts may be automatically installed to run with the client on the user's desktop computer (e.g., the client device 102) upon the user logging into the user's profile.

Figure 6:
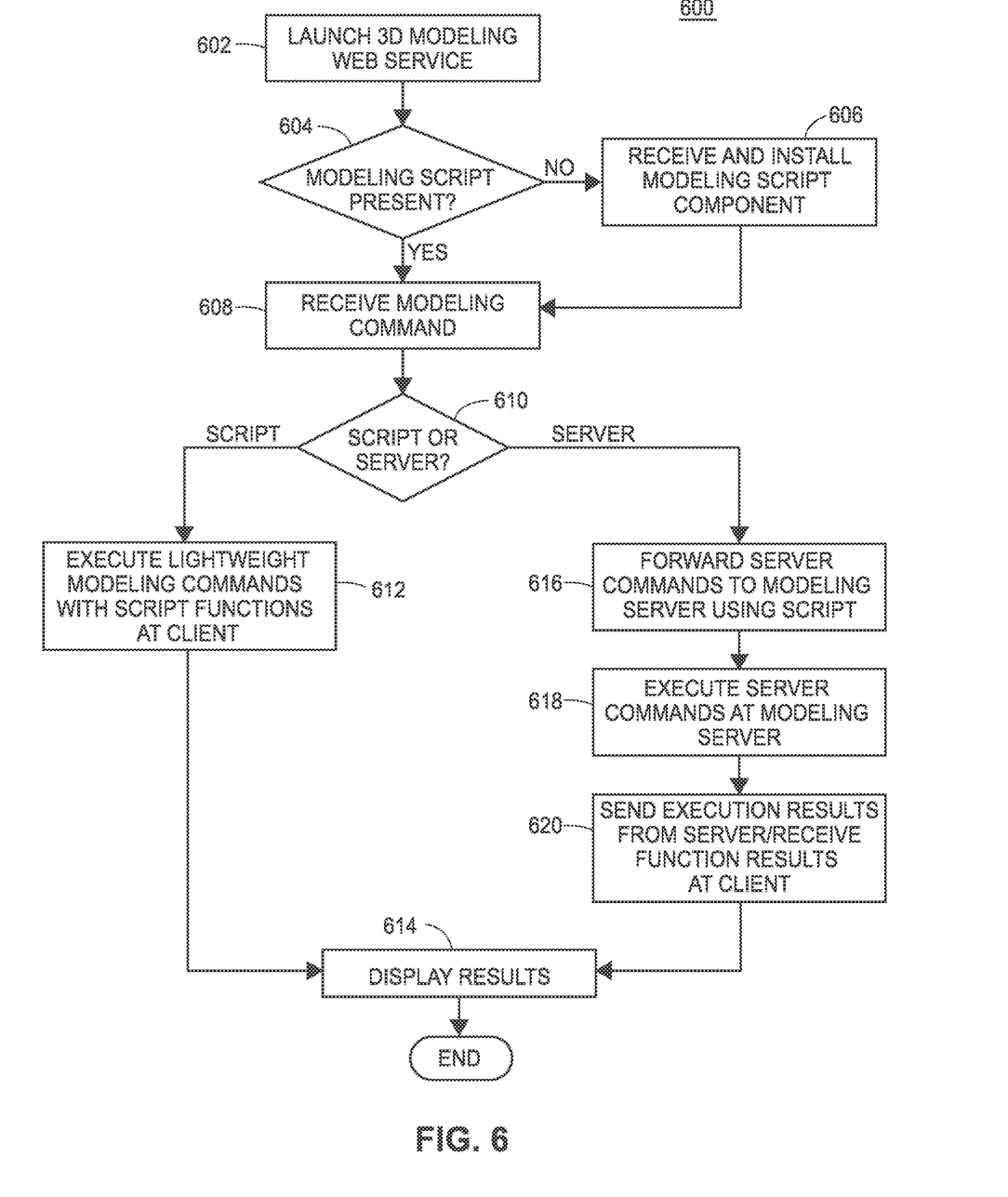
FIG. 6 a flow diagram of an example method for extending the functionality of the web-based, 3D modeling system.

FIG. 6 is a flow diagram of an example method 600 for using a 3D modeling system 100 that is implemented partially as a script interpretable by a browser application executing on a client device 102, and partially as a component executing on a server 106. The method 600 may include one or more blocks, modules, functions or routines in the form of computer-executable instructions that are stored in a tangible computer-readable medium and executed using a processor 118 of the client device 102 (e.g., a personal computer, a smart phone, tablet computer, a mobile computing device, or other personal computing device, as described herein). The method 600 may be included as part of any modules of a computing environment for a web-based 3D modeling system 100 or as part of a module that is external to such a system. For example, the method 600 may be part of a 3D modeling engine web service 108, the backend modeling server 106, a modeling script component 152, or any other module or component. The method 600 may execute at the client device 102 as interpreted by a browser 150, at a server 106, or any combination of the client(s) and server(s). Further, a user may activate or disable one or more functions to restrict or prevent the system 100 from collecting and personal data from the user. For example, a user interface may present an interactive control to allow a user to opt-in or opt-out of any user personal data collection. FIG. 6 will be described with reference to FIGS. 1-5 for ease of explanation, but the method 600 may of course be utilized with other objects and user interfaces.

At block 602, a 3D modeling web service 108 may be launched at a computing device 102. In some embodiments, a user may access a user interface web site of the 3D modeling engine web service 108. From the website, a client device may access functions to create, edit, and manipulate 3D models and model data 112 as described herein. At block 604, the method 600 may determine if a modeling script component 152 is installed on the client device 102. In some embodiments, the script component 152 may have been installed in the browser component 150 as a plug-in or other type of software. For example, the 3D modeling web service 108 may have been previously launched on the client device 102 and the script 152 may have been saved to the device 102 at that time. In other embodiments, launching the 3D modeling web service at block 602 may cause the script component 152 to be pulled or pushed to the client device 102 as either a plug-in or as a script that is executed as part of the data for rendering the website on the client device (e.g., using Javascript functions embedded in the website HTML code or another, similar technique). If block 604 determines that the script is not present on the client device 102, then the method 600 may receive and install the modeling script component at block 606.

Once the method 600 determines that the client device 102 includes the functions of the script component 152 (either by confirming installation of a script plugin or by determining that the script component is included as script instructions within the encoding of the web site accessed at block 602), the user may interact with a user interface or other component of the web service 108 to issue a command 608 for the 3D modeling system 100. For example, the user may create or edit a model, view or save a model, manipulate the view or orientation of the model, etc. At block 610, the script component 152 may cause the processor 118 to execute instructions to determine a type of modeling command that was received at block 608. In some embodiments, block 610 may execute instructions to determine if the command may be executed by the script component 152 or the service 108. For example, the script component 152 may include instructions that are able to execute lightweight modeling system commands (e.g., commands to view or export a 3D model, manipulate the view of the 3D model within the user interface, etc). Where block 610 determines that the script 152 is able to execute the received command, the command may be executed by the script at block 612. The executed command result may then be displayed at block 614. Where block 610 determines that the script 152 is not able to execute a received computationally expensive command, the method 600 may cause the processor 118 to execute instructions to forward the command to the modeling server 106 and the modeling engine web service 108 at block 616. At block 618, the method 600 may cause the modeling server 108 and the modeling engine web service 108 to execute the command that was forwarded at block 616. At block 620, the method 600 may cause the results of the command that was executed at block 618 to be sent back from the modeling server 106 to the client 102 via the network 104. The results of the command that was executed at the server 106 may then be displayed at the client device at block 614.

Thus, the 3D modeling system 100 and method 600 described herein may be implemented partially as a client-side script component 152 and a partially as a server-side modeling engine web service 108 on a modeling server 106. For example, the client-side script component 152 may execute lightweight 3D modeling system commands while the server-side modeling engine 108 may execute computationally expensive 3D modeling system commands. For example, the script component 154 may be accessed by the client device 102 upon visiting a web page of the modeling service hosted by the web server 106. The script 154 may include Javascript® instructions for viewing a 3D model 112 in a browser window without installing a browser plug-in or a standalone application on the client device 102. However, to edit the model, the script component 154 may forward commands and requests to the server 106 via the network 104 and also receive modified model data from the server 106. The system 100 and method 600 described herein may allow users to use some of the functionality of 3D modeling software (e.g., viewing, exporting, etc.) without installing special software while delegating to the server 106 any resource-intensive operations that may be too complicated for the script component 154 to execute.

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

For example, the network 104, may include but is not limited to any combination of a LAN, a MAN, a WAN, a mobile, a wired or wireless network, a private network, or a virtual private network. Moreover, while only one client device is illustrated in FIG. 1 to simplify and clarify the description, it is understood that any number of client computers or display devices are supported and can be in communication with the server 106.

Additionally, certain embodiments are described herein as including logic or a number of components, modules, blocks, or mechanisms. Modules and blocks may constitute either software modules (e.g., code stored on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" or a "routine" is a self-consistent sequence of operations or similar processing leading to a desired result. In this context, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Still further, the figures depict preferred embodiments of a web-based 3D modeling system for purposes of illustration only. One of ordinary skill in the art will readily recognize from the following discussion that alternative embodiments of the structures and methods illustrated herein may be employed without departing from the principles described herein.

Upon reading this disclosure, those of skill in the art will appreciate still additional alternative structural and functional designs for a system and a process for providing web-based 3D modeling through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A tangible non-transitory computer-readable medium storing instructions for three-dimensional (3D) modeling in a client browser application that executes on a first processor of a client computing device and a server modeling engine that executes on a second processor of a server computing device, the instructions comprising:
a script that executes on the first processor including functions to receive a user command from the client browser application, to determine whether the user command includes a computationally lightweight function of a plurality of computationally lightweight functions or a computationally expensive function of a plurality of computationally expensive functions based on a command type for the received user command, the plurality of computationally lightweight functions comprising functions to view the 3d model, export the 3d model, position the 3d model, and adjust one or more 3d objects within the 3D model and the plurality of computationally expensive functions comprising functions to edit, create, and manipulate the 3D model, to execute the computationally lightweight function if the script determines that the user command includes the computationally lightweight function, and to send the user command to the server computing device if the script determines that the user command includes the computationally expensive function, wherein when the script determines that the user command includes a computationally expensive function, the user command is not executed on the first processor;
a modeling engine that executes on the second processor including functions to receive the forwarded user command, execute the computationally expensive function, and send results of the computationally expensive function execution to the client computing device; and
a display module that executes on the first processor including functions to receive results of the computational lightweight function execution and the computationally expensive function execution and display a 3D model in a window of the client browser application according to the received results,
wherein the results of the computationally expensive function execution include modified model data of a 3D model.

2. The computer-readable medium of claim 1, wherein the script includes further functions to cause the client browser to interpret the computationally lightweight function.

3. The computer-readable medium of claim 2, wherein the computationally expensive function includes functions to edit the model data of the 3D model.

4. The computer-readable medium of claim 3, wherein the model data is stored in a model database of the server computing device.

5. The computer-readable medium of claim 1, wherein the script is received by the client browser application from the server modeling engine.

6. The computer-readable medium of claim 5, wherein the client browser application receives the script in response to a request from the browser application to the server modeling engine, and wherein the modeling engine receives the request each time the browser application initiates a session with the server modeling engine.

7. The computer-readable medium of claim 6, wherein the browser application includes functions to interpret the script.

8. A method for implementing functions of a 3D modeling system via a communications network with a client browser application that executes on a client computing device processor and a server modeling engine that executes on a server computing device processor, the method comprising:
sending a request for modeling website data to the server modeling engine via the communications network;
receiving modeling website data at the client browser application in response to the request via the communications network, wherein the modeling website data includes:
a user interface module for displaying a modeling user interface within a window of the client browser application, and
a modeling script component including functions interpretable by the browser application;
receiving a user command at the user interface;
determining whether the received user command includes a computationally lightweight function of a plurality of computationally lightweight functions or a computationally expensive function of a plurality of computationally expensive functions based on a command type for the received user command, the plurality of computationally lightweight functions comprising functions to view the 3d model, export the 3d model, position the 3d model, and adjust one or more 3d objects within the 3D model and the plurality of computationally expensive functions comprising functions to edit, create, and manipulate the 3D model;
upon determining that the user command includes a computationally lightweight function, executing the computationally lightweight function at the client computing device using a function of the modeling script component; and
upon determining that the user command includes a computationally expensive function:
forwarding the user command to the server modeling engine via the communications network, wherein the computationally expensive function is not executed at the client computing device, and
receiving model data via the communications network, wherein the received model data has been modified by execution of the computationally expensive function at the server modeling engine.

9. The method of claim 8, wherein the modeling script component functions include script instructions embedded within HTML instructions corresponding to the modeling website data.

10. The method of claim 8, wherein the computationally expensive function includes one or more functions to edit the received model data.

11. The method of claim 10, wherein the modeling script component includes further functions interpretable by the client browser application to interpret the received model data, determine a combination of geometric primitives, and invoke an OpenGL function corresponding to the geometric primitives.

12. A method for implementing functions of a three-dimensional (3D) modeling system, the method comprising:
    receiving a first 3D modeling command at a user interface of a client computing device;
    determining, based on a command type for the first 3D modeling command, that the first 3D modeling command includes a computationally lightweight function of a plurality of computationally lightweight function, the plurality of computationally lightweight functions comprising functions to view the 3d model, export the 3d model, position the 3d model, and adjust one or more 3d objects within the 3D model;
    executing the computationally lightweight function at the client computing device;
    receiving a second 3D modeling command at the user interface of the client computing device;
    determining, based on a command type for the second 3D modeling command, that the second 3D modeling command includes a computationally expensive function of a plurality of computationally expensive functions, the plurality of computationally expensive functions comprising commands to edit, create, and manipulate the 3D model;
    forwarding the 3D modeling command to a server modeling engine, wherein the computationally expensive function is not executed at the client computing device, and
    receiving model data that has been modified by an execution of the computationally expensive function at the server modeling engine.

13. The method of claim 12, wherein the computationally expensive command includes one or more functions to edit received model data.

* * * * *